US010093024B2

(12) United States Patent
Inoue et al.

(10) Patent No.: US 10,093,024 B2
(45) Date of Patent: Oct. 9, 2018

(54) ROBOT LINEAR-OBJECT HANDLING STRUCTURE

(71) Applicant: FANUC CORPORATION, Yamanashi (JP)

(72) Inventors: Toshihiko Inoue, Yamanashi (JP); Tomoyuki Motokado, Yamanashi (JP); Masayoshi Mori, Yamanashi (JP); Wataru Amemiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/477,346

(22) Filed: Apr. 3, 2017

(65) Prior Publication Data

US 2017/0282381 A1 Oct. 5, 2017

(30) Foreign Application Priority Data

Apr. 5, 2016 (JP) ................................ 2016-075775

(51) Int. Cl.
*B25J 19/00* (2006.01)
*B25J 9/00* (2006.01)

(52) U.S. Cl.
CPC ....... *B25J 19/0025* (2013.01); *B25J 19/0041* (2013.01); *B25J 9/0024* (2013.01)

(58) Field of Classification Search
CPC .............................. B25J 9/0024; B25J 9/0041
See application file for complete search history.

(56) References Cited

U.S. PATENT DOCUMENTS 4,459,898 A * 7/1984 Harjar ........................ B25J 9/08 174/86
4,830,569 A * 5/1989 Jannborg ................ B25J 15/04 173/117

(Continued)

FOREIGN PATENT DOCUMENTS

JP H03-36790 U 4/1991
JP H06-508303 A 9/1994

(Continued)

OTHER PUBLICATIONS

Japanese Office Action, dated Mar. 13, 2018, in corresponding Japan patent application No. 2016-075775; 6 pgs.

(Continued)

*Primary Examiner* — William Kelleher
*Assistant Examiner* — Gregory T Prather
(74) *Attorney, Agent, or Firm* — Maier & Maier, PLLC

(57) ABSTRACT

Provided is a linear-object handling structure of a robot, in which a linear object for a motor that drives a second arm and a wrist and a linear object for a work tool that is attached to the wrist pass from a base part to the inside of a rotational drum in the vicinity of a first axis, are guided upward to the outside through a through-hole provided in the rotational drum, are respectively curved toward opposite lateral sides of the rotational drum in the substantially circumferential directions while each given a margin of length required for the motion of the rotational drum, are guided from the lateral sides of the rotational drum to the second arm in the longitudinal direction of the first arm while each being given a margin of length required for the motions of the first arm and the second arm.

6 Claims, 3 Drawing Sheets

2 9 10 D 11 7 8 C 6 16 13 5 14 12 16 B 1 15 4 A 3

(56) References Cited

U.S. PATENT DOCUMENTS

| | | | | |
|---|---|---|---|---|
| 5,437,207 | A | 8/1995 | Zimmer | |
| 7,559,590 | B1 * | 7/2009 | Jones | B25J 19/0025 294/2 |
| 9,796,097 | B2 * | 10/2017 | Kirihara | B25J 17/02 |
| 2005/0011295 | A1 * | 1/2005 | Shiraki | B25J 19/0025 74/490.02 |
| 2005/0172606 | A1 * | 8/2005 | Wehler | B25J 19/0025 59/78.1 |
| 2009/0224109 | A1 * | 9/2009 | Hasunuma | B23K 11/315 248/52 |
| 2009/0249915 | A1 * | 10/2009 | Iwai | B25J 19/0025 74/490.02 |
| 2010/0032420 | A1 | 2/2010 | Inoue et al. | |
| 2010/0313694 | A1 * | 12/2010 | Aoki | B25J 19/0029 74/490.02 |
| 2014/0137685 | A1 * | 5/2014 | Iwayama | B25J 18/00 74/490.02 |
| 2015/0027261 | A1 * | 1/2015 | Okahisa | B25J 18/04 74/490.02 |
| 2017/0252931 | A1 * | 9/2017 | Zhang | B25J 19/0029 |

FOREIGN PATENT DOCUMENTS

| | | | |
|---|---|---|---|
| JP | 3483862 | B | 10/2002 |
| JP | 4741639 | B | 2/2010 |
| JP | 2013-111710 | A | 6/2013 |

OTHER PUBLICATIONS

Search Report, dated Mar. 7, 2018, in corresponding Japan patent application No. 2016-075775; 18 pgs.

* cited by examiner 1
2
3
4
5
6
7
8
9
10
11
12
13
14
15
16
16
A
B
C
D 8
11
7
D
10
6
12
14
13
2
16
5
9
1
15
4

ROBOT LINEAR-OBJECT HANDLING STRUCTURE

CROSS-REFERENCE TO RELATED APPLICATIONS

This application is based on Japanese Patent Application No. 2016-075775, the contents of which are incorporated herein by reference.

TECHNICAL FIELD

The present invention relates to a robot linear-object handling structure.

BACKGROUND ART

Conventionally known is a linear-object handling structure in which a linear object for controlling a servomotor that operates a robot itself and a linear object for controlling a work tool that is attached to a wrist of the robot are installed in an arm of the robot.

However, some work-tool controlling linear objects do not have flexibility in the twist direction and thus cannot be installed inside the arm. Linear objects that do not have flexibility in the twist direction have been wired outside the arm (for example, see PTL 1).

CITATION LIST

Patent Literature

{PTL 1} Publication of Japanese Patent No. 3483862

SUMMARY OF INVENTION

The present invention provides the following solutions.

According to one aspect, the present invention provides a robot linear-object handling structure including: a base part; a rotational drum that is mounted on the base part in a rotatable manner about a first axis that is normal to an installation surface of the base part; a first arm that is mounted on the rotational drum in a rotatable manner about a second axis that is orthogonal to the first axis; a second arm that is mounted at a leading end of the first arm in a rotatable manner about a third axis that is parallel to the second axis; and a wrist that is mounted at a leading end of the second arm rotatably, wherein a linear object for a motor that drives the second arm and the wrist and a linear object for a work tool that is attached to the wrist pass from the base part to the inside of the rotational drum, are guided upward to the outside through a through-hole provided in an upper part of the rotational drum, are respectively curved toward opposite lateral sides of the rotational drum in substantially circumferential directions while each given a margin of length required for the motion of the rotational drum, and are guided from the lateral sides of the rotational drum to the second arm in the longitudinal direction of the first arm while each given a margin of length required for the motions of the first arm and the second arm.

DESCRIPTION OF EMBODIMENTS

A linear-object handling structure 1 of a robot 2 according to one embodiment of the present invention will be described below with reference to the accompanying drawings.

Figure 1:
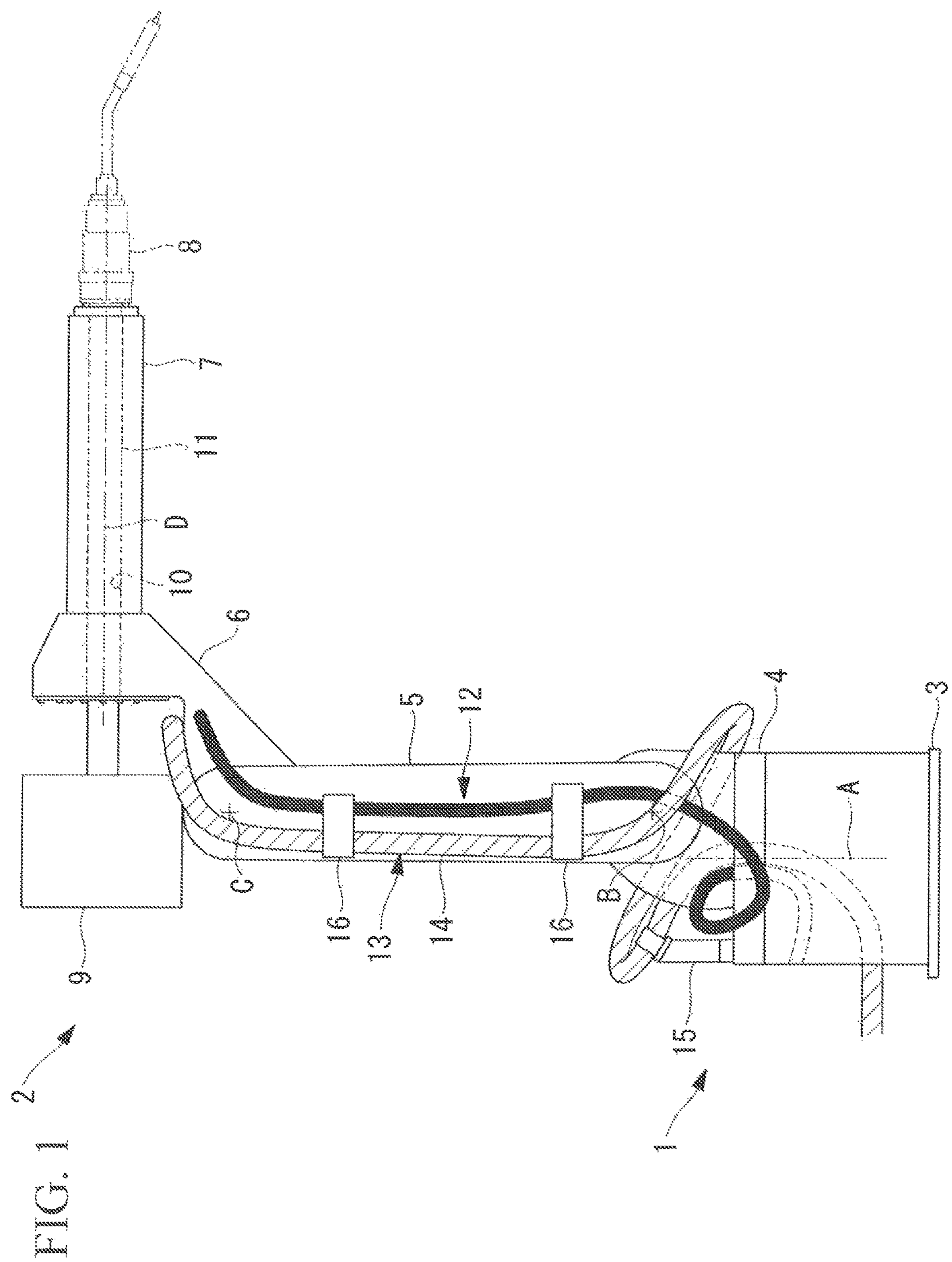
FIG. 1 is a side view showing a robot linear-object handling structure according to one embodiment of the present invention.

As shown in FIG. 1, the robot 2 to which the linear-object handling structure 1 of the present embodiment is applied is provided with: a base part 3 that is installed on the ground; a rotational drum 4 that is supported with respect to the base part 3 in a rotatable manner about a vertical first axis A; a first arm 5 that is supported on the rotational drum 4 in a rotatable manner about a horizontal second axis B; a second arm 6 that is supported at a leading end of the first arm 5 in a rotatable manner about a third axis C that is parallel to the second axis B; and a wrist 7 that is supported at a leading end of the second arm 6 in a rotatable manner about a fourth axis D that is perpendicular to the third axis C.

A welding torch 8 is mounted, as a work tool, at a leading end of the wrist 7.

Furthermore, a wire feeder 9 is fixed, as a work-tool control unit, at the rear of the second arm 6.

A hollow part that penetrates from the base part 3 to a section above the rotational drum 4 along the first axis A is formed in the vicinity of the first axis A. The hollow part is formed so as to have a relatively large diameter, for example, by using a hypoid gear set (not shown) as a reducer and using a ring gear that can secure a large space in the vicinity of the first axis A, as an output hypoid gear fixed to the rotational drum 4.

Furthermore, it is preferred to adopt a structure in which a motor (not shown) is not disposed near the rotational drum 4, by transmitting power from the motor to an input hypoid gear engaged with the output hypoid gear via a spur gear set (not shown) and by disposing the motor in the hollow base part 3.

Furthermore, a through-path 10 that penetrates from the rear of the second arm 6 to the leading end of the wrist 7 along the fourth axis D is provided in the vicinity of the fourth axis D. A conduit 11 having the flexibility is inserted through the through-path 10, and a linear object 13 to be connected to the welding torch 8 passes through the conduit 11 and is wired into the welding torch 8.

The linear-object handling structure 1 of the robot 2 of the present embodiment is a linear-object handling structure in which a first linear object (linear object for motors) 12 that controls a motor for driving the second arm 6 with respect to the first arm 5 and a motor for driving the wrist 7 and the second linear object (linear object for the work tool) 13 that actuates the welding torch 8 are wired from the base part 3 to the second arm 6. The second linear object 13 includes a gas hose for supplying assist gas, a wire conduit for supplying welding wire, a power supply cable for supplying power to the welding torch 8, etc., and is wired in a state in which they are bunched together by a conduit 14 having the flexibility.

The conduit 14 is, for example, a tubular member that is manufactured from cloth, such as aramid fiber, or that is resin-molded and has flexibility such that, when manufactured from cloth, it is curved together with the linear object therein, and, when resin-molded, it has a tube wall formed into a wave shape in the longitudinal section, and the tube wall is elongated and contracted in the longitudinal direction, thereby allowing it to be easily curved. On the other hand, when manufactured from cloth, although the conduit 14 has flexibility in the twist direction, it is easily worn out after long-term use and has low stability in its behavior during operation; when manufactured from resin, although the conduit 14 has low flexibility in the twist direction, it is less worn out after long-term use and shows highly stable behavior during operation.

Figure 2:
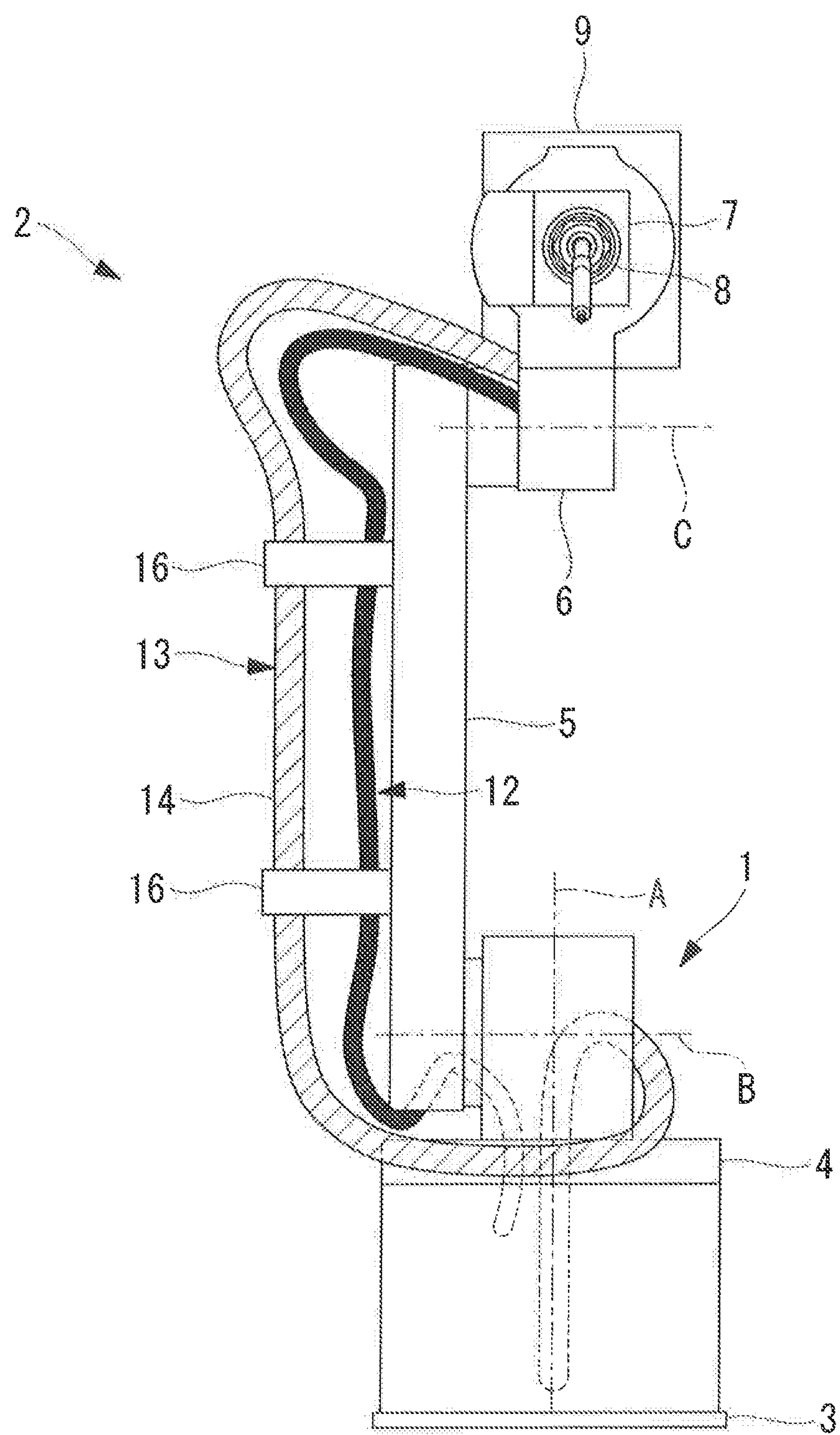
FIG. 2 is a front view showing the robot linear-object handling structure shown in FIG. 1.
Figure 3:
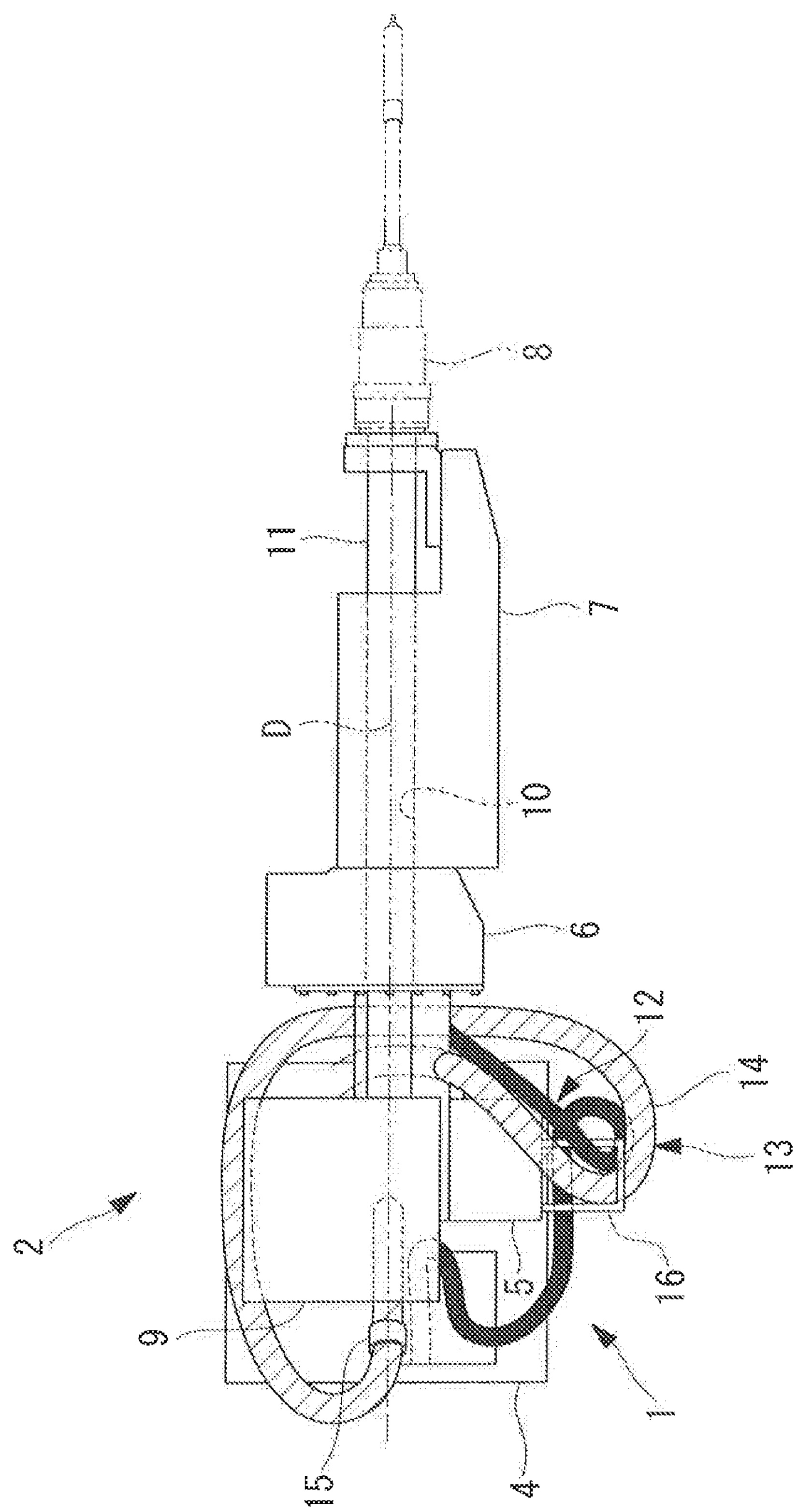
FIG. 3 is a plan view showing the robot linear-object handling structure shown in FIG. 1.

As shown in FIGS. 2 and 3, in the linear-object handling structure 1 of the robot 2 of the present embodiment, the first linear object 12 and the second linear object 13 that are inserted into the base part 3 from a side surface of the base part 3 are first made to penetrate the hollow part upward from the inside of the base part 3 along the first axis A, are made to pass through the inside of the rotational drum 4, and extend upward to the outside through a through-hole in an upper part of the rotational drum 4. Next, the two types of linear objects 12 and 13 extending upward to the outside of the rotational drum 4 are curved once toward the back of the rotational drum 4.

The second linear object 13 curved toward the back of the rotational drum 4 is supported, by a support bracket 15 that is fixed to the rotational drum 4, so as to extend in the radial direction and is then curved clockwise as viewed in plan view in a substantially circumferential direction, with a space provided in a radially outward part of the rotational drum 4. The support bracket 15 supports the conduit 14, which covers the second linear object 13, while allowing movement thereof in the twist direction and movement thereof in the longitudinal direction.

The first linear object 12 curved toward the back of the rotational drum 4 is curved counterclockwise as viewed in plan view with a space provided in a radially outward part of the rotational drum 4.

Accordingly, the first linear object 12 and the second linear object 13 are each given a margin of length required for the motion of the rotational drum 4.

In the front view of the robot 2 shown in FIG. 2, the first arm 5 is disposed at the left side of the first axis A, which is the center of rotation of the rotational drum 4; thus, the second linear object 13 wired clockwise is looped around the radially outward part of the rotational drum 4 at substantially 270 degrees and is then curved upward at the lower part of the first arm 5. On the other hand, the first linear object 12 wired counterclockwise is looped around the radially outward part of the rotational drum 4 at substantially 90 degrees and is then similarly curved upward at the lower part of the first arm 5.

In this case, the first linear object 12 and the second linear object 13 are also each given a margin of length required for the motion of the first arm 5 with respect to the rotational drum 4.

Then, the two types of linear objects 12 and 13 curved upward are guided to the second arm 6 in the longitudinal direction of the first arm 5 along a side surface of the first arm 5. The two types of linear objects 12 and 13 are fixed to the first arm 5 at proper longitudinal intermediate places by a plurality of support brackets 16 that are provided with a space therebetween in the longitudinal direction of the first arm 5.

When wired from the first arm 5 to the second arm 6, the first linear object 12 and the second linear object 13 are also each given a margin of length required for the motion of the second arm 6 with respect to the first arm 5.

The operation of the thus-configured linear-object handling structure 1 of the robot 2 of the present embodiment will be described below.

According to the linear-object handling structure 1 of the robot 2 of the present embodiment, because the first linear object 12 and the second linear object 13 extend in the vicinity of the first axis A via the hollow part, which penetrates from the base part 3 to the rotational drum 4 in the vertical direction, it is possible to minimize path-length changes to which the corresponding parts of the two types of linear objects 12 and 13 are subjected due to the rotation of the rotational drum 4 about the first axis A. In particular, in either case in which the linear object 13 is covered by the cloth conduit 14 or in the resin conduit 14, which has low flexibility in the twist direction, the second linear object 13 is wired so as to be curved toward the back of the rotational drum 4 and then looped around the rotational drum 4 at substantially 270 degrees; thus, there is an advantage in that a change in the path length due to the rotation of the rotational drum 4 can be absorbed by applying the flexibility in the direction of curvature.

Furthermore, because the two types of linear objects 12 and 13 are wired so as to extend in the longitudinal direction along the side surface of the first arm 5 after being looped around the rotational drum 4 in the substantially circumferential direction, changes in the path lengths due to the rotation of the first arm 5 about the second axis B with respect to the rotational drum 4 can also be absorbed by applying the flexibility in the directions of curvature of the first linear object 12 and the conduit 14 of the second linear object 13.

Furthermore, even when the path lengths of the two types of linear objects 12 and 13, which are guided from the first arm 5 to the second arm 6, are changed due to the rotation of the second arm 6 about the third axis C with respect to the first arm 5, the changes in the path lengths can be absorbed by applying the flexibility in the directions of curvature of the first linear object 12 and the conduit 14 of the second linear object 13.

In this way, according to the linear-object handling structure 1 of the robot 2 of the present embodiment, a motor for rotating the rotational drum 4 is disposed in the base part 3, thereby making it possible to secure a large space above the rotational drum 4 and to route the two types of the linear objects 12 and 13 all around the rotational drum 4 in the opposite substantially-circumferential directions. Accordingly, there is an advantage in that it is possible to secure sufficient path lengths in the substantially circumferential direction of the rotational drum 4, and, even in the linear object 13, which has low flexibility in the twist direction, a change in the path length due to the motion of the rotational drum 4 can be absorbed by applying the flexibility in the direction of curvature.

Furthermore, the linear objects 12 and 13 are wired in the substantially circumferential direction of the rotational drum 4 and then guided to the second arm 6 in the longitudinal direction of the first arm 5, and thus, changes in the path lengths due to the rotation of the first arm 5 about the second axis B with respect to the rotational drum 4 can also be absorbed by applying the flexibility in the directions of curvature of the linear objects 12 and 13.

Because the two types of linear objects 12 and 13 are disposed by being looped around the rotational drum 4, around which there are less peripheral devices, and are wired along the side surface of the first arm 5, it is possible to reduce the possibility of the linear objects 12 and 13 interfering with peripheral devices even when the robot 2 is operated. Accordingly, it is possible to make the linear objects 12 and 13 stably behave in accordance with the motion of the robot 2 without performing behavior checking and guide-position adjustment before system operation and to absorb path changes due to the motion of the robot 2.

Furthermore, in the present embodiment, because the second linear object 13, which is composed of a plurality of cables etc. used for the welding torch 8, is covered by a bunched manner in the conduit 14, which has the flexibility, there is an advantage in that the second linear object 13 can be handled with being bunched by the conduit 14, which has flexibility, good ease of handling at the time of replacement, and an easily reproducible wiring route before replacement.

Furthermore, a linear object, as in a wire conduit, for which frequent periodic replacement is required in a shorter period of time than other linear objects may be separated from other work-tool linear objects, and those linear objects may be wired in parallel. Accordingly, it is possible to quickly replace only the wire conduit and to easily reproduce the wiring thereof.

As a matter of course, there is a method in which the wire conduit is separated from another work-tool linear object from a lower part of the first arm 5, is made to pass at the back of the rotational drum 4, and is guided to the hollow part along the first axis A, by focusing on the ease of replacement; however, in this case, it is needless to say that the range of motion of the first arm 5 is limited.

Furthermore, in the present embodiment, because the second linear object 13 for the welding torch 8 is curved in the substantially circumferential direction longer than the first linear object 12 for driving the motors and is then guided to the second arm 6 along the side surface of the first arm 5 in the same way as the first linear object 12, there is an advantage in that the second linear object 13, which has low flexibility in the twist direction, is wired long in the substantially circumferential direction of the rotational drum 4, thereby making it possible to effectively absorb a change in the path length due to the motion of the rotational drum 4 and the motion of the first arm 5 by more effectively applying the flexibility in the direction of curvature.

Note that, in the present embodiment, although the welding torch 8 is shown as a work tool, the work tool is not limited thereto. Furthermore, two or more work tools may be provided.

As a result, the above-described embodiment leads to the following aspect.

According to one aspect, the present invention provides a robot linear-object handling structure including: a base part; a rotational drum that is mounted on the base part in a rotatable manner about a first axis that is normal to an installation surface of the base part; a first arm that is mounted on the rotational drum in a rotatable manner about a second axis that is orthogonal to the first axis; a second arm that is mounted at a leading end of the first arm in a rotatable manner about a third axis that is parallel to the second axis; and a wrist that is mounted at a leading end of the second arm rotatably, wherein a linear object for a motor that drives the second arm and the wrist and a linear object for a work tool that is attached to the wrist pass from the base part to the inside of the rotational drum, are guided upward to the outside through a through-hole provided in an upper part of the rotational drum, are respectively curved toward opposite lateral sides of the rotational drum in substantially circumferential directions while each given a margin of length required for the motion of the rotational drum, and are guided from the lateral sides of the rotational drum to the second arm in the longitudinal direction of the first arm while each given a margin of length required for the motions of the first arm and the second arm.

According to the present aspect, the linear object for the motor that drives the respective axes of the robot and the linear object for the work tool attached to the wrist pass from the base part to the inside of the rotational drum in the vicinity of the first axis and extend upward to the outside through the through-hole in the rotational drum. Then, the extending two types of linear objects are curved about the first axis in clockwise and counterclockwise manners, i.e., in the opposite directions from each other, toward lateral sides of the rotational drum in substantially circumferential directions.

The two types of linear objects are wired in the opposite substantially-circumferential directions, thereby making it possible to secure sufficient path lengths in the substantially circumferential directions of the rotational drum and to absorb changes in the path lengths due to the motion of the rotational drum by applying the flexibility in the directions of curvature even when the linear objects have low flexibility in the twist direction. Furthermore, after being wired in the substantially circumferential directions of the rotational drum, the linear objects are guided to the second arm in the longitudinal direction of the first arm, thereby making it also possible to absorb changes in the path lengths due to the rotation of the first arm about the second axis with respect to the rotational drum by applying the flexibility in the directions of curvature of the linear objects. Accordingly, it is possible to make the linear objects stably behave in accordance with the motion of the robot without performing behavior checking or guide-position adjustment before system operation and to absorb path changes due to the motion of the robot.

In the above-described aspect, a plurality of the linear objects for the work tool may be bunched together and covered by a flexible conduit.

By doing so, it is possible to handle a plurality of linear objects bunched by the flexible conduit, to improve the ease of handling at the time of replacement, and to easily reproduce the wiring route before replacement.

Furthermore, in the above-described aspect, the linear object for the work tool may be curved in the substantially circumferential direction longer than the linear object for the motor and may be then guided to the second arm along a side surface of the first arm in the same way as the linear object for the motor.

Although the linear object for the work tool has lower flexibility in the twist direction than the linear object for the motor, the linear object for the work tool is wired long in the substantially circumferential direction of the rotational drum, thereby making it possible to absorb a change in the path length due to the motion of the rotational drum and the motion of the first arm by effectively applying the flexibility in the direction of curvature.

According to the present invention, an advantageous effect is afforded in that, even when linear objects that do not have flexibility in the twist direction are wired outside an arm, it is possible to make the linear objects stably behave in accordance with the motion of a robot without performing behavior checking or guide-position adjustment before system operation and to absorb path changes due to the motion of the robot.

REFERENCE SIGNS LIST

1 linear-object handling structure
2 robot

3 base part
4 rotational drum
5 first arm
6 second arm
7 wrist
12, 13 linear object
14 conduit
A first axis
B second axis
C third axis

The invention claimed is:

1. A robot deformable linear-object handling structure comprising:

a base part; a rotational drum that is mounted on the base part in a rotatable manner about a first axis that is normal to an installation surface of the base part; a first arm that is mounted on the rotational drum in a rotatable manner about a second axis that is orthogonal to the first axis; a second arm that is mounted at a leading end of the first arm in a rotatable manner about a third axis that is parallel to the second axis; and a wrist that is mounted at a leading end of the second arm rotatably, wherein a deformable linear object for a motor that drives the second arm and the wrist and at least one deformable linear object for a work tool that is attached to the wrist pass from the base part to the inside of the rotational drum are guided upward to the outside through a through-hole provided in an upper part of the rotational drum, one of the deformable linear object for the motor and the at least one deformable linear object for the work tool is wired clockwise along a lateral side of the rotational drum while being given a margin of length required for the motion of the rotational drum, the other of the deformable linear object for the motor and the at least one deformable linear object for the work tool is wired counterclockwise along the lateral side of the rotational drum while being given a margin of length required for the motion of the rotational drum, and the deformable linear object for the motor and the at least one deformable linear object for the work tool are guided from the lateral sides of the rotational drum to the second arm in the longitudinal direction of the first arm while each being given a margin of length required for the motions of the first arm and the second arm.

2. A robot deformable linear-object handling structure according to claim 1, wherein the at least one deformable linear object for the work tool comprises a plurality of deformable linear objects for the work tool, and the plurality of deformable linear objects for the work tool are bunched together and covered by a flexible conduit.

3. A robot deformable linear-object handling structure according to claim 1, wherein the at least one deformable linear object for the work tool is looped around a radially outward part of the rotational drum longer than the deformable linear object for the motor is, and is then guided to the second arm along a side surface of the first arm in the same way as the deformable linear object for the motor.

4. A robot deformable linear-object handling structure according to claim 1, further comprising:

a support bracket whose one end is secured to the rotational drum and whose other end supports the at least one deformable linear object for the work tool that is guided upward to the outside through the through-hole so as to extend radially outward with respect to the first axis.

5. A robot deformable linear-object handling structure according to claim 1, wherein the deformable linear object for the motor is looped around the radially outward part of the rotational drum at substantially 90 degrees.

6. A robot deformable linear-object handling structure according to claim 5, wherein the at least one deformable linear object for the work tool is looped around the radially outward part of the rotational drum at substantially 270 degrees.

* * * * *